(12) United States Patent
Cho

(10) Patent No.: US 8,266,537 B2
(45) Date of Patent: Sep. 11, 2012

(54) APPARATUS AND METHOD FOR MANAGING MULTIMEDIA INFORMATION CONFIGURING GRAPHICAL USER INTERFACE

(75) Inventor: Sung-hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1131 days.

(21) Appl. No.: 11/829,541

(22) Filed: Jul. 27, 2007

(65) Prior Publication Data

US 2008/0120547 A1    May 22, 2008

(30) Foreign Application Priority Data

Nov. 17, 2006 (KR) .................. 10-2006-0113936

(51) Int. Cl.
*G06F 3/00* (2006.01)
(52) U.S. Cl. .............. 715/762; 715/764; 715/763
(58) Field of Classification Search .............. 715/764, 715/762, 763, 765–771
See application file for complete search history.

(56) References Cited

U.S. PATENT DOCUMENTS

| | | | | |
|---|---|---|---|---|
| 5,801,692 A | * | 9/1998 | Muzio et al. .................. | 715/764 |
| 6,195,092 B1 | | 2/2001 | Dhond et al. | |
| 6,424,711 B1 | * | 7/2002 | Bayless et al. ........... | 379/355.09 |
| 6,731,310 B2 | * | 5/2004 | Craycroft et al. ............. | 715/765 |
| 7,039,875 B2 | * | 5/2006 | Khalfay et al. ............... | 715/762 |
| 7,181,700 B2 | * | 2/2007 | Guerrero ....................... | 715/810 |
| 2002/0154166 A1 | * | 10/2002 | Sanders et al. ................ | 345/764 |
| 2005/0071769 A1 | * | 3/2005 | Suzuki et al. ................. | 715/762 |
| 2006/0100991 A1 | * | 5/2006 | Hartel et al. ....................... | 707/3 |
| 2007/0067739 A1 | * | 3/2007 | Atarashi et al. .............. | 715/818 |
| 2007/0266329 A1 | * | 11/2007 | Gaudette ....................... | 715/763 |

FOREIGN PATENT DOCUMENTS

| | | |
|---|---|---|
| JP | 2004-253004 | 9/2004 |
| JP | 2005-258829 | 9/2005 |
| KR | 2002-80594 | 10/2002 |
| KR | 2005-11451 | 1/2005 |
| KR | 2005-30619 | 3/2005 |

* cited by examiner

*Primary Examiner* — Weilun Lo
*Assistant Examiner* — Rashedul Hassan
(74) *Attorney, Agent, or Firm* — NSIP Law (57) ABSTRACT

An apparatus to manage a multimedia-information-configuring graphical user interface includes a storage unit that includes a mapping information table to store a state of a widget and an action mapped to the state and a current state table to store a current state of the widget, an input unit to receive GUI-setting data to set a configuration and an operation of the widget, and a control unit to generate the mapping information table by parsing the GUI-setting data, searches the mapping information table for the action using the current state table, and to perform the action found by the searching.

33 Claims, 8 Drawing Sheets

GUI-SETTING DATA (110)

Element(120)
  media1=" media1.data"
  media2=" media2.data"

Content(130)
  CONTENT_00=media1," image label"
  CONTENT_01=media2," text label"

State(140)
  STATE_FOCUSED, all states=media1, "tada_sound"
  STATE_UNFOCUSED, all states=media2, "unfocusing_ani"
  STATIONARY, STATE_FOCUSED=media2, "unfocusing_ani"
  STATIONARY, all states=media2, "unfocusing_ani"

APPARATUS AND METHOD FOR MANAGING MULTIMEDIA INFORMATION CONFIGURING GRAPHICAL USER INTERFACE

CROSS-REFERENCE TO RELATED APPLICATION

This application claims the benefit of Korean Application No. 2006-113936, filed Nov. 17, 2006 in the Korean Intellectual Property Office, the disclosure of which is incorporated herein by reference.

BACKGROUND OF THE INVENTION

1. Field of the Invention

Aspects of the present invention relate to an apparatus and method to easily change an appearance of a graphical user interface (GUI), and more particularly to an apparatus and method to configure and operate a widget using GUI-setting data, in order to efficiently customize the widget.

2. Description of the Related Art

Users generally interact with software via a graphical user interface (GUI). As GUIs become more complicated, the demand for an intuitive GUI has been increasing. Generally, "widgets" are included in a GUI library and are used to configure the GUI of an application. The term "widget" refers to an operable user interface (UI) component that a user interacts with to perform operations on a GUI. Common examples of widgets include a check-box, radio buttons, a text field, a pull-down menu, a hyperlink, a tab, a spin box, a slider, a scroll bar, buttons, and various other types of functional components displayed on a GUI.

A widget includes data and instructions to execute processes to manipulate the data. A widget used in a GUI is configured with graphical data and/or functions to process the data.

Conventionally, the GUI functions are designed separately from the original functions of the application. A conventional method of operating a GUI is to change the look of the GUI by changing the view of the widget. However, a problem with this conventional art is that the screen configuration and the operation of the GUI have to be designed separately. Accordingly, when a user designs the screen configuration of a GUI and the operation of the GUI using the conventional art, the process is inefficient. Also, in order to design the screen configuration and the operation of the GUI, an authoring tool is conventionally used. However, it is inefficient and difficult to separately design the screen configuration and the operation of the GUI using the authoring tool.

SUMMARY OF THE INVENTION

Accordingly, an aspect of the present invention provides an apparatus and method to design a screen configuration and an operation of a GUI using GUI-setting data, which efficiently enable a user to design the screen configuration and the operation of the GUI by only changing the GUI-setting data.

According to an aspect of the present invention, an apparatus to manage a multimedia-information-configuring graphical user interface (GUI) includes a storage unit that to store a mapping information table in which a status of a widget and an action mapped to a state are stored and a current state table in which a current state of the widget is stored, an input unit to receive GUI-setting data to set a configuration and an operation of the widget, and a control unit to generate the mapping information table by parsing the GUI-setting data, to search the mapping information table for the action using the current state table, and to perform an action found by the searching.

According to another aspect of the present invention, a method to manage a multimedia-information-configuring graphical user interface includes receiving GUI-setting data to set a configuration and an operation of a widget, generating a mapping information table in which a state of the widget and an action mapped to the state are stored and a current state table in which a current state of the widget is stored by parsing the GUI-setting data, searching the mapping information table for the action using the current state table, and performing the action found by the searching.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become and more readily appreciated from the following description of the embodiments, taken in conjunction with the accompanying drawings of which.

DETAILED DESCRIPTION OF THE EMBODIMENT

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
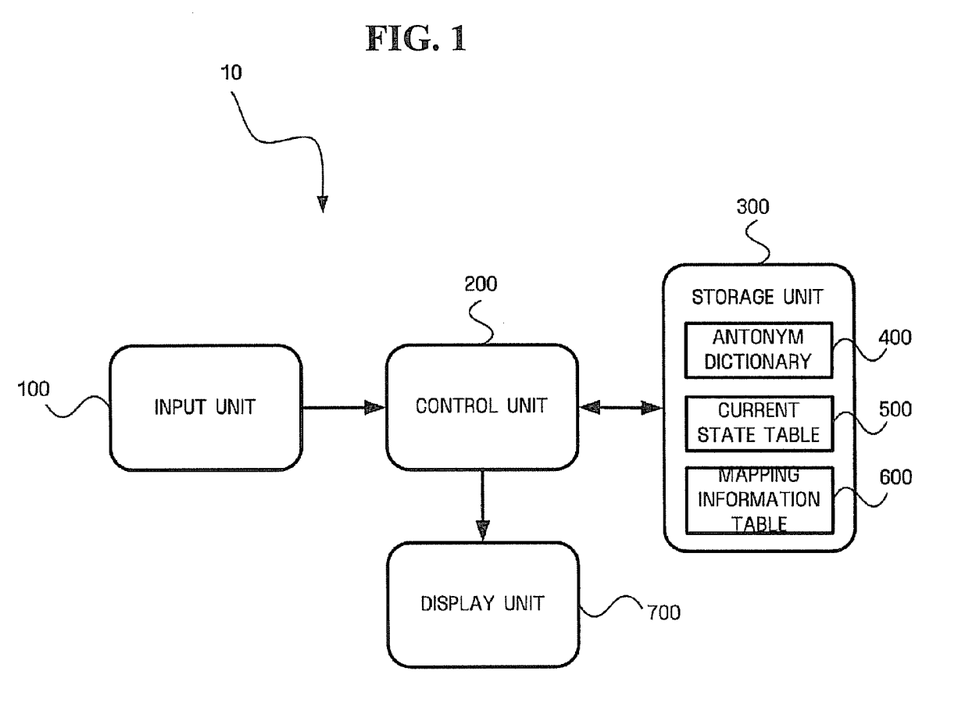
FIG. 1 is a block diagram illustrating an apparatus to manage multimedia data which constitutes a GUI according to an embodiment of the present invention.

FIG. 1 is a block diagram showing an apparatus 10 to manage multimedia data which constitutes a graphical user interface (GUI) according to an embodiment of the present invention. The apparatus 10 includes an input unit 100, a control unit 200, a storage unit 300, and a display unit 700. It is understood that other components may be used in conjunction with the apparatus 10 in addition to those shown in FIG. 1 and described below. While not specifically limited thereto, the apparatus 10 can be a portable or non-portable computer having the input unit 100 and/or display unit 200 included within or otherwise connectable to the computer.

The term "unit," as used herein, refers to, but is not limited to referring to, a software or hardware component, such as a Field Programmable Gate Array (FPGA) or an Application Specific Integrated Circuit (ASIC), which performs certain tasks. A module (or a unit using the module) may advantageously be configured to reside in an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The input unit 100 transmits information to the control unit 200. The input unit 100 may be embodied in various forms, such as, for example, a keyboard, a computer mouse, a touch screen, or any other device which is connected to a computer or processor via cable or through a wireless connection that can be used to input information.

The term "widget" refers to an operable user interface component (UI Component) that a user can interact with to perform certain functions on a GUI, which is displayed on the display unit 700. In general, a user interacts with a widget or a combination of widgets to perform various functions in the GUI. Common examples of widgets include a check-box, radio buttons, a text field, a pull-down menu, a hyperlink, a tab, a spin box, a slider, a scroll bar, buttons, and various other types of components displayed on a screen. Widgets are frequently, but not necessarily, represented by icons or other visual representations. According to an aspect of the present invention, GUI-setting data 110 is used to design and operate a widget.

Figure 2:
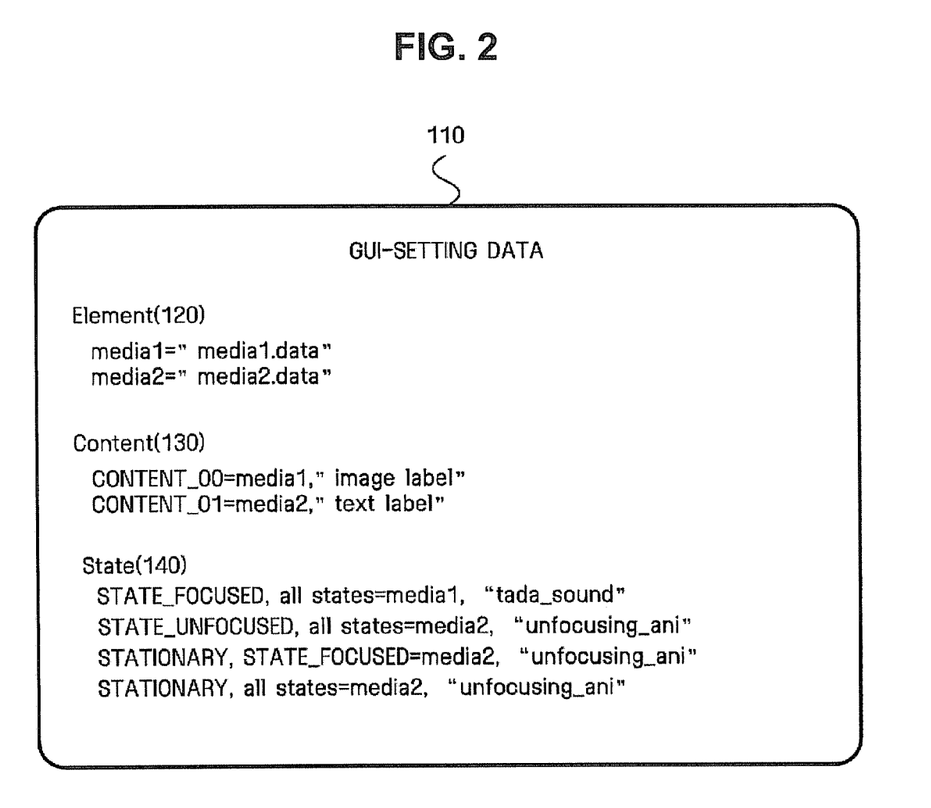
FIG. 2 is a conceptual view illustrating GUI-setting data according to an embodiment of the present invention.

The GUI-setting data 110 (shown in FIG. 2) is input to the control unit 200 via the input unit 100 in order to generate and operate the GUI. FIG. 2 is a conceptual view showing the GUI-setting data 110 according to an embodiment of the present invention. For instance, the GUI-setting data 110 could be read from a disc or received across a network in order to generate the GUI.

Multimedia data is displayed on a GUI screen of the display unit 700 and is used to design operations of the GUI. This multimedia data is divided into two types of data: content which is shown on the GUI screen, and data which is used to perform an action to change an appearance of the content on the GUI screen. Hereinafter, content which is shown on the GUI screen may be referred to as "content," and data which is used to perform an action to change an appearance of the content on the GUI screen will be referred to as "action." The content and the action are defined in the GUI-setting data 110. The GUI-setting data 110 includes an element 120 which defines the multimedia data constituting the widget, content 130 which defines the content of the widget, and a state 140 which indicates a new state of the widget.

As shown in FIG. 2, the element 120 defines the multimedia data constituting the widget. In the shown example, data is defined as media1="media1.data" and media2="media2.data." These definitions are used to define the data used in media1 constituting the widget as media1.data, and other data used in media2 constituting the widget as media2.data. It is understood that "multimedia data" refers to not only conventional text, but also graphical images and high-capacity files such as flash files, audio files, and video files.

A "flash" file supports vector and raster graphics, features action scripts, two-way audio and video streaming, and is a general term for a development environment, a player, or an application file. The flash file is used to create various webpage elements, such as animations and advertisements, and to integrate videos into webpages. Flash files are currently in widespread use and are used for a variety of purposes, such as, for example, to develop Internet applications.

A video file is composed of a series of images which are rapidly displayed to create an appearance of moving objects. Video files are an important type of multimedia content. Various types of formats are currently used to create video files, such as MPEG, MOV, RealVideo, and AV formats. Video files are used on the Internet, in GUIs, and in various other locations.

The aforementioned multimedia data is defined by the element 120 and is used to create the widget. The content 130 defines content provided to a user by the widget. The content 130 corresponds to a space on the GUI which outputs a result set by a user in the multimedia data. As an example, the content 130 shown in FIG. 2 is defined as CONTENT_00=media1, "image label," CONTENT_01=media2, "text label," which indicates that an optional area in media1 is set to display the image label, and an optional area in media2 is set to display the text label. As a result, it is possible to display images or texts on the display unit 700 using the image label and the text label as an identifier, and perform other actions as well, such as, for example, play audio files or video files.

In the state 140, an action is divided into a transitional action and a stationary action. The transitional action is a temporary transition. The stationary action is repeated after the temporary transition. To describe the aforementioned transitional action and the stationary action, a transition of a specific button which exists in the widget will be described for exemplary purposes.

When the button is unfocused, the button is focused by a focusing state. At this time, the focusing state refers to the transitional action, and a repeated action generated after the button is focused refers to the stationary action. By sorting actions generated in the content 130 (as described above), all actions generated in the content 130 can be defined.

In FIG. 2, the transitional action and the stationary action are defined in the state 140. STATE_FOCUSED, all states=media1, "tada_sound" defines a transitional action to play the audio file called "tada_sound" in media1, when the state makes the transition from the unfocused state to the focused state, regardless of any other state. STATE_UNFOCUSED, all states=media2, "unfocusing_ani" defines a transitional action to play the video file called "unfocusing_ani" in media2 when the state makes the transition from the focused state to the unfocused state, regardless of any of the other states. It is understood that a very wide variety of audio, video, and text files can be used. The antonym dictionary 400 is generated by opposite transition states (e.g., focused to unfocused) parsed from the received GUI-setting data 110.

STATIONARY, STATE_FOCUSED=media1, "focused_ani" defines a stationary action to play "focused_ani" in media1 while the focused state lasts after the transition. STATIONARY, all states=media2, "running video" defines a stationary action to play a video file in media2 after the transition, regardless of any of the other states. As described above, the multimedia data is controlled to correspond to the widget by defining the GUI-setting data 110. As such, a label, such as "stationary" as shown in FIG. 2, can be used to distinguish the stationary actions from the transitional actions for purposes of parsing and generating the dictionary 400 and/or the table 600. However, it is understood that other methods can be used to differentiate the stationary and transition actions, such as by labeling the transitional action in addition to or instead of the stationary action as shown.

Figure 3A:
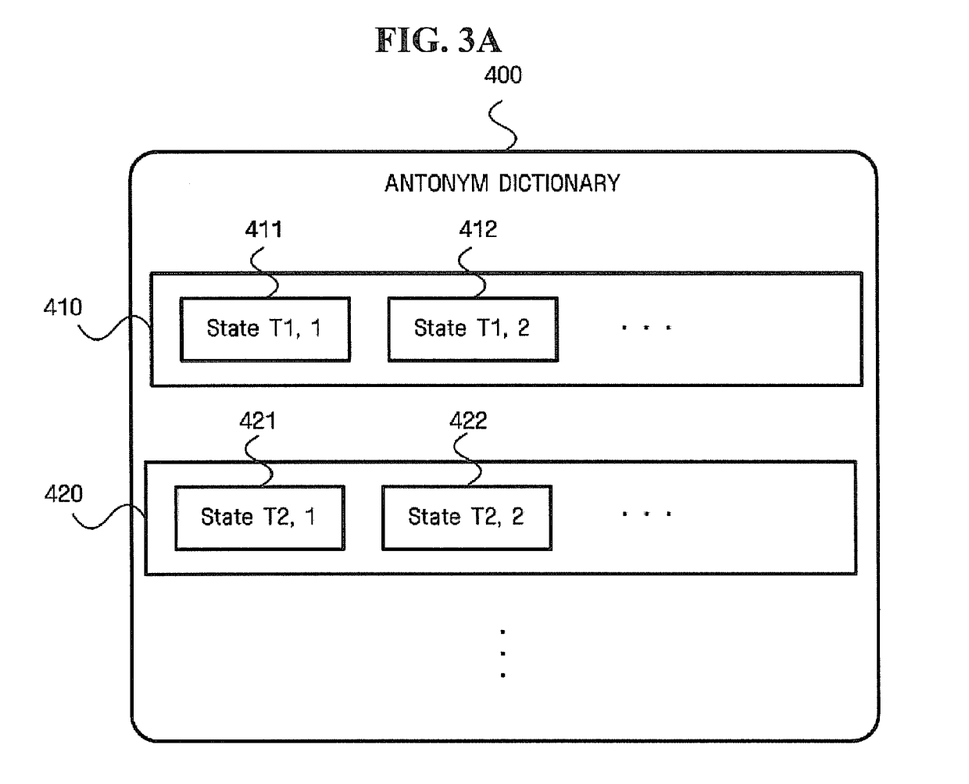
FIGS. 3A, 3B, and 3C are block diagrams illustrating various components included within a storage unit according to an embodiment of the present invention.
Figure 3B:
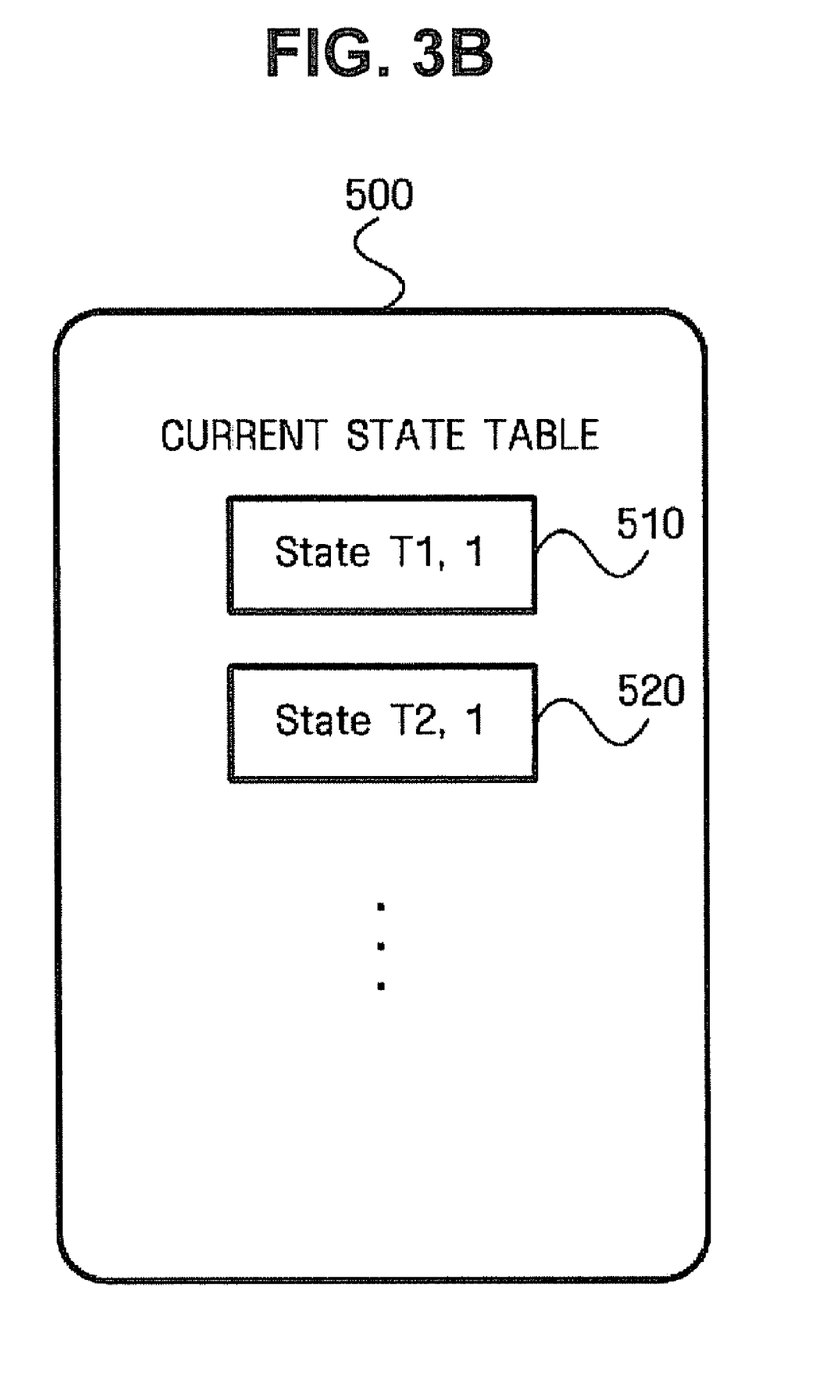
Figure 3C:
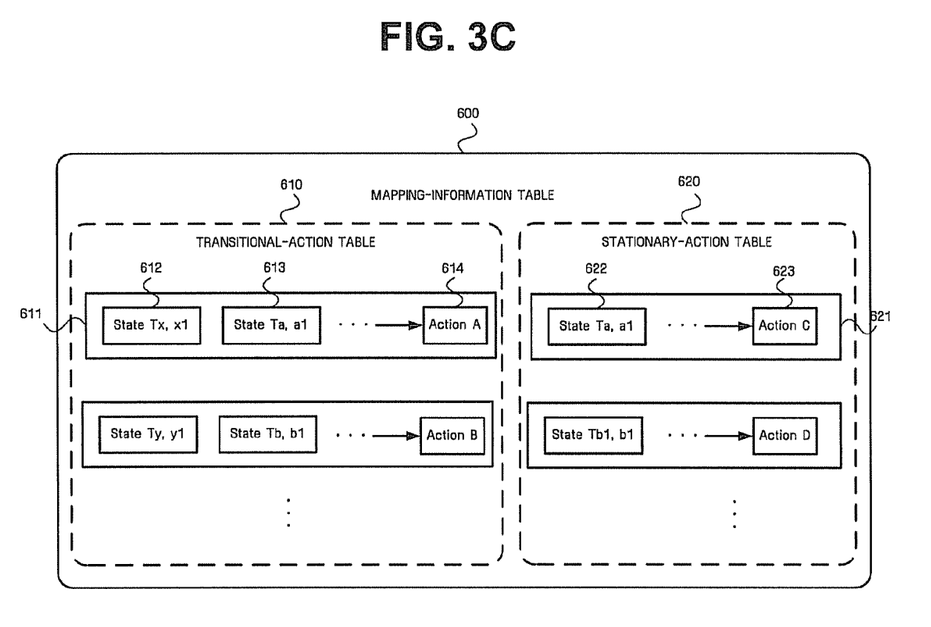

FIGS. 3A, 3B, and 3C are block diagrams illustrating various components included within the storage unit 300 of FIG.

1 according to an embodiment of the present invention. FIG. 3A depicts an antonym dictionary 400, FIG. 3B depicts a current state table 500, and FIG. 3C depicts a mapping information table 600. The storage unit 300 includes the antonym dictionary 400, the current state table 500, and the mapping information table 600, each of which corresponds to any of various types of memory in which data can be stored. Examples of the memory include, but are not limited to, a hard disk, as well as other types of volatile or nonvolatile memories known in the art, such as flash drives, optical media, etc.

As shown in FIG. 3A, incompatible states are grouped in a specific item 410 of the antonym dictionary 400 for State T1. For example, if "State T1, 1" 411 indicates the focused state, "State T1, 2" 412 indicates the unfocused state. These two states 411 and 412 are grouped in the specific item 410.

Likewise, incompatible states are grouped in another specific item 420 of the antonym dictionary 400 for State T2. For example, if "State T2, 1" 421 indicates the selected state, "State T2, 2" 422 indicates the unselected state. These two states 421 and 422 are grouped in the other specific item 420. The antonym dictionary 400 may include various other types of incompatible states known in the art. For example, the antonym dictionary 400 may include an enabled state and a disabled state. The function of the antonym dictionary 400 will be further described in a description of the control unit 200 below.

FIG. 3B illustrates a current state table 500 which displays the current state of the widget according to an embodiment of the present invention. Specifically, the current state table 500 indicates the current state of a certain area of the widget by providing multimedia content such as graphics, text or sound to a user. The control unit 200 configures the current state table 500 by reading the current state of the widget.

When it is assumed that "State T1, 1" corresponds to the focused state and "State T1,2" corresponds the unfocused state in the item 510 related to the State T1 of the current state table 500, the current state of the item 510 corresponds to the "State T1,1" in the current state table 500. If the state T1 makes a transition from the current state "State T1, 1", the control unit 200 searches the antonym dictionary 400 for "State T1,2" which is a state that is incompatible with the current state "State T1, 1" in order to erase "State T1," in the current state table 500 and set the current state table 500 to "State T1,2."

During a transition in the current state table 500, the control unit 200 searches the antonym dictionary 400 for the state "State T1,2" which is incompatible with the current state "State T1,1" of the current state table 500. Since the current state "State T1,1" and the state "State T1, 2" which is incompatible with the current state "State T, 1" will each make a transition, it is possible to find the new state "State T1,2" of the current state table 500 without inputting a state whenever the state of the current state table 500 is changed through the aforementioned method. It is understood that the aforementioned method may be applied to a very wide variety of states corresponding to a wide variety of widgets.

In the current state table 500, the new changed state "State T1,2" is set to item 510 as described above, and other existing states (e.g., the enabled state T2,1 (item 520) and the selected state) are maintained. If there are no further transitions, then the states of the State T2, the state of the State T3, etc. are maintained without any further changes in the current state table 500.

FIG. 3C illustrates a mapping information table 600 according to an embodiment of the present invention. Information on an action mapped corresponding to the widget state is stored in the mapping information table 600. The mapping information table 600 is generated by parsing the GUI-setting data 110 received by the control unit 200. The mapping information table 600 is divided into a transitional action table 610 and a stationary action table 620.

The transitional action table 610 defines a transitional action performed when the state makes a transition. It is understood that the transactional action table 610 may also define a combination of various transitional states and various transitional actions mapped to the combination, and is not limited to defining only a single transitional action.

The stationary action table 620 defines a stationary action generated after the state makes the transition. It is understood that the stationary action table 620 may also define a combination of various stationary states and various stationary actions mapped to the combination, and is not limited to defining only a single stationary action.

The control unit 200 searches the mapping information table 600 for the action generated by the widget using the states of the current state table 500. When the action found by the searching is performed, the configuration and the content of the widget is changed.

If the state makes a transition, the control unit 200 searches for the matched action of the transitional action table 610 using the new state of the current state table 500 and other states stored in the current state table 500. The process of setting the new state in the current state table 500 is the same as the process of setting the state for the State T1 shown in the current state table 500 in FIG. 3B and described above, and a detailed explanation thereof will be omitted.

In an item 611 of the transitional action table 610, "State Tx,x1" 612 is the new state that corresponds to a new state to be set in the current state table 500, and "State Ta,a1" 613 corresponds to the existing state maintained in the current state table 500. The specific item 611 of 610 defines an action 614 generated by the widget when these states are satisfied.

The control unit 200 compares the states of the current state table 500 with items related to the combination of various states defined by the transitional action table 600, and searches for an action 614 mapped to the identical combination. Then, the identical action 614 is generated by the widget according to the searching result. If the states are not identical, then the widget generates an action 614 mapped to the closest approximately matching combination (i.e., the combination that includes the largest matching number of the additional current states obtained from the current state table 500).

Similarly, the control unit 200 finds the stationary action in the stationary action table 620. In another item 621 of the transitional action table 620, "State Ta,a1" 622 corresponds to the existing state maintained in the current state table 500. Since the stationary action has not changed, there has not been a state transition.

The control unit 200 searches for the identical combination by comparing the existing states. The item 621 of the stationary action table 620 defines states and the widget generates an action 623 when the states are satisfied. Accordingly, a stationary action generated by the widget is found by searching the stationary action table 620 for a state that is identical with the state of the current state table 500. If the states are not identical, the widget generates an action 623 mapped to the closest approximately matching combination (i.e., the combination that includes the largest matching number of the current states obtained from the current state table 500).

The control unit 200 parses the GUI-setting data 110, and then configures the mapping information table 600. Also, the control unit 200 searches for an action of the state change corresponding to a search command input by a GUI user, and performs the action based on a result of the searching. The term "parsing" refers to analyzing the structure of a sentence by dividing the sentence into basic units using a specific data structure and establishing a relationship between the basic units. For example, the basic units can be related as blocks, sentences, equations, operators, and operands. It is understood that the basic units can be related to each other in a wide variety of ways according to various formulas.

The control unit 200 generates the mapping information table 600, which stores a data structure of a state or a plurality of states and an action mapped by the state or a plurality of actions mapped by the plurality of states. In order to generate the mapping information table 600, the control unit 200 reads the GUI-setting data 110 and analyzes the data structure in the GUI-setting data 110. If, for example, STATE_FOCUSED is indicated in the GUI-setting data 110, the control unit 200 parses the GUI-setting data 110. Then, the result of the parsing is stored in the mapping information table 600 as a critical inner value (e.g., 0x0100004). It is understood that other critical inner values may also be used to store the result of the parsing.

When a user interacts with a widget, for example, by selecting a button or cancelling the selection by entering commands to the input unit 100, the control unit 200 searches for an action according to the state change and performs the action. Since the process of searching for an action and performing the action has already been described above with reference to FIGS. 3A, 3B, and 3C, a detailed explanation thereof will be omitted.

The process generated between the control unit 200, the antonym dictionary 400 stored in the storage unit 300, the current state table 500, and the mapping information table 600 will be described using the GUI-setting data 110 illustrated in FIG. 2. It is assumed for exemplary purposes that the state 140 of the GUI-setting data 110 defines STATE_FO-CUSED, all states=media1 "tada_sound." The control unit 200 reads the data and configures the mapping information table 600 that includes the read data.

For exemplary purposes, it is assumed that the current state table 500 is initially in the unfocused state. When the state of the current state table 500 changes, the control unit 200 searches the antonym dictionary 400 for a state that is incompatible with the current state. Since the incompatible state is the focused state, the control unit 200 cancels the unfocused state from the current state table 500, and sets the state of the current state table 500 to the focused state. Then, the control unit 200 searches the mapping information table 600 and plays the "tada_sound" in (all states), media1 because the current state table 500 has changed from the unfocused state to the focused state and there are no other conditions.

The display unit 700 displays the GUI which includes one or more widgets for a user to interact with. The display unit 700 may be embodied in a variety of forms known in the art, such as, for example, a CRT monitor, an LCD screen, a PDP connected to a personal computer, a network monitor connected to a network computer, or a display device built into mobile devices which display multimedia content. These mobile devices may be many different types, such as, for example, a personal multimedia player (PMP), an MP3 player, a DMB player, or a cell phone.

Figure 4:
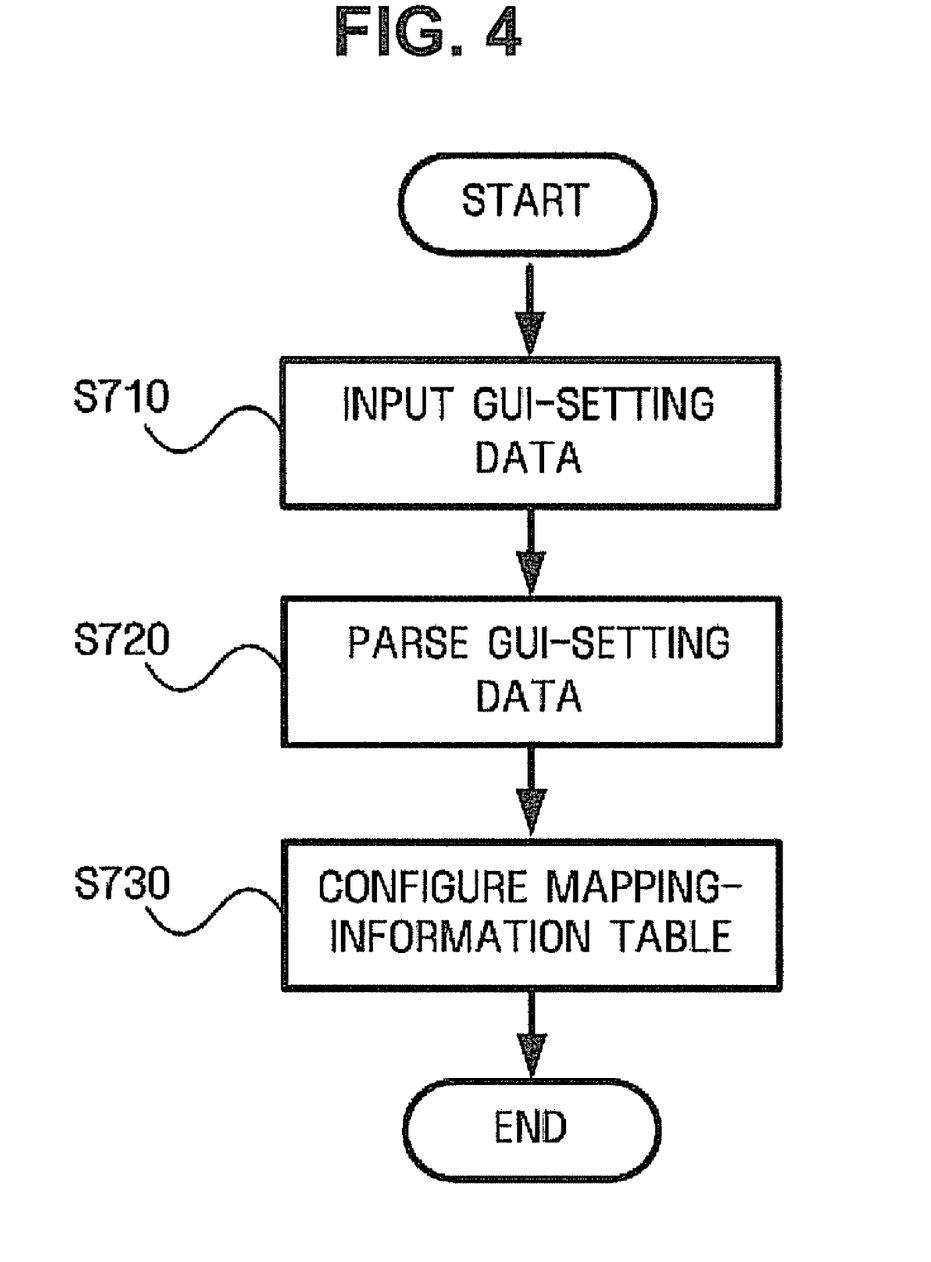
FIG. 4 is a flowchart illustrating a method of setting a mapping information table according to an embodiment of the present invention.

FIG. 4 is a flowchart showing a method of setting the mapping information table 600 according to an embodiment of the present invention. At operation S710, the GUI-setting data 110 is input to the control unit 200. At operation S720, the control unit 200 parses the GUI-setting data. Then, at operation S730, the control unit 200 configures the mapping information table 600 by generating the mapping information table 600 based on the parsed information and storing the mapping information table 600 in the storage unit 300. The parsing operation was explained above in the description of the control unit 200, and a detailed explanation thereof will be omitted.

Figure 5:
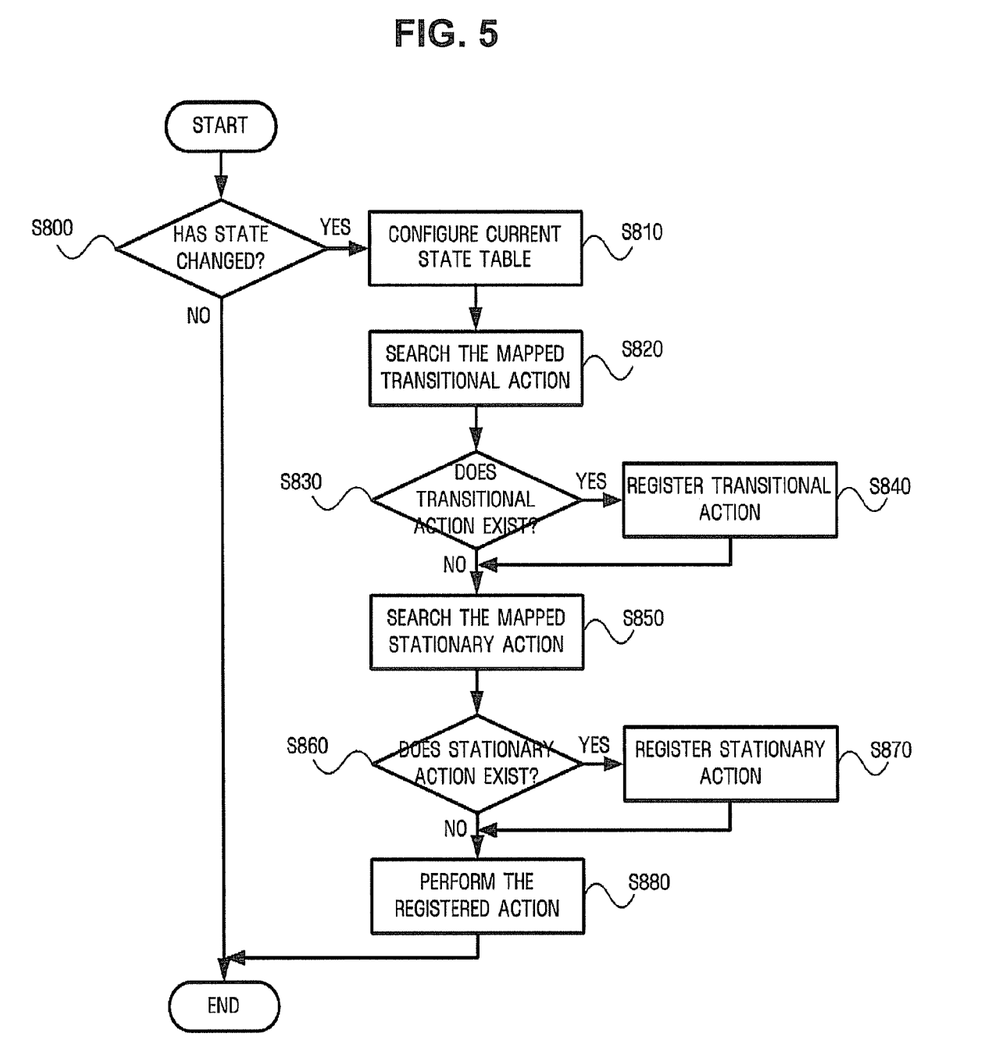
FIG. 5 is a flowchart illustrating a method of executing an action using a GUI widget according to an embodiment of the present invention.

FIG. 5 is a flowchart showing a method of executing an action using a GUI widget according to an embodiment of the present invention. At operation S800, the control unit 200 determines whether there is a change of the widget state. If the control unit 200 determines at operation S800 that the state has changed, the control unit 200 configures the current state table 500 using the current state of the widget at operation S810. Then, at operation S820, the control unit 200 searches the mapping information table 600 for transitional actions mapped to the new state to be mapped (i.e., the changed state) and the existing state, which will be described below with reference to FIG. 6.

At operation S830, the control unit 200 searches for the transitional action. If the control unit 200 finds the corresponding transitional action in the mapping information table 600 at operation S830, the control unit 200 registers the transitional action in an auxiliary storage unit at operation S840. The auxiliary storage unit can exist in the widget (i.e, included in a RAM used to execute actions on the widget) or as a storage device, such as an exterior memory which interacts with the widget or a hard disk in a computer, such as the storage unit 300. The auxiliary storage unit is used to temporarily store a transitional action or a stationary action found by the searching at operation S820, and may be erased after the found action is performed. However, it is understood that the auxiliary storage unit is not required to be erased.

If the control unit 200 does not find a transitional action at operation S830, the control unit 200 searches for a stationary action mapped to the current state at operation S850. The control unit 200 searches the stationary action table 620 of the mapping information table 600 for an action corresponding to the state of the current state table 500.

If the control unit 200 finds the stationary action at operation S860, the control unit 200 registers the stationary action at operation S870 and performs the registered action at operation S880. Then, the transitional and/or stationary actions are performed in a registered order. Therefore, if both a transitional action and a stationary action are registered, the transitional action is performed before the stationary action is performed, because the operation of registering the transitional action at operation S840 occurs before the operation of registering the stationary action at operation S880. If the control unit 200 finds a transitional action at operation S830 and does not find a stationary action at operation S860, the registered transitional action is directly performed at operation S880.

Figure 6:
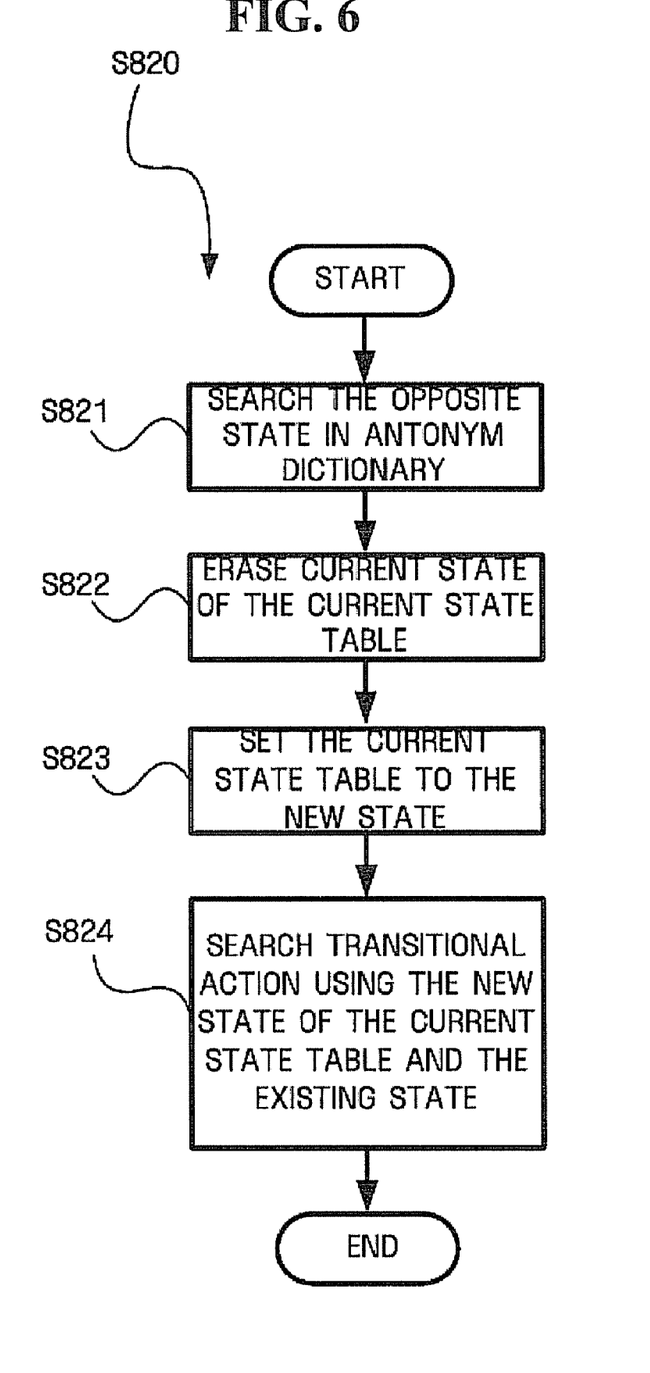
FIG. 6 is a flowchart illustrating a method of searching for a mapped transitional action in detail according to an embodiment of the present invention.

FIG. 6 is a flowchart illustrating method of searching for a mapped transitional action (i.e., operation S820) in detail according to an embodiment of the present invention. When the control unit 200 searches the mapping information table 600 for the mapped transitional action at operation S820 (FIG. 5), the control unit 200 preferentially searches the antonym dictionary 400 for a state that is incompatible with the existing state of the newly generated current state table 500 at operation S821.

Then, at operation S822, the control unit 200 erases the current state of the current state table 500. At operation S823, the control unit 200 sets the current state table 500 to the new state. At operation S824, the control unit 200 searches the transitional action table 610 of the mapping information table 600 for an action mapped to the changed state of the current state table 500 and the existing (not changed) state. The method of searching the corresponding transitional action using the state of the current state table 500 is the same method as the method described above with reference to FIG. 3C, and a detailed explanation thereof will be omitted.

As described above, an apparatus and method to manage a multimedia-information-configuring graphical user interface according to aspects of the present invention produces one or more of the following effects. First, aspects of the present invention enable a user to easily modify a screen configuration and an operation of a widget which is used to configure a GUI by changing the GUI-setting data. Second, aspects of the present invention enable a user to easily generate the GUI-setting data using an authoring tool, so a user can more efficiently design a GUI in comparison to using methods and apparatuses of the conventional art.

Various components of the apparatus 10, the antonym dictionary 400, the current state table 500, and the mapping information table 600, shown in FIGS. 1, 3A, 3B, and 3C, respectively, such as the control unit 200 and the storage unit 300, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to manage a multimedia-information-configuring graphical user interface (GUI), the apparatus comprising:
    a storage to store a mapping information table in which a state of a widget and an action mapped to the state are stored, a current state table in which a current state of the widget is stored, and an antonym dictionary that only includes one or more states that are incompatible with the current state of the widget;
    an input unit to receive GUI-setting data to set a configuration and an operation of the widget; and
    a control unit to generate the mapping information table by parsing the GUI-setting data, to search the mapping information table for the action using the current state table, and to perform the action found by the searching.

2. The apparatus of claim 1, wherein the action is one of a transitional action in which the current state of the widget is changed and a stationary action in which the current state of the widget is not changed.

3. The apparatus of claim 1, wherein the GUI-setting data comprises:
    data that is used to design the widget;
    content that is provided by the widget; and
    information on the state of the widget and the action mapped to the state.

4. The apparatus of claim 1, wherein the mapping information table comprises:
    a transitional action table to store a transitional action mapped to a combination of transitional states and transitional actions related to a new state and an existing state; and
    a stationary action table to store a stationary action mapped to a combination of stationary states and stationary actions related to the existing state.

5. The apparatus of claim 1, wherein, when the current state is changed, the control unit searches the antonym dictionary for a state that is incompatible with the current state stored in the current state table, erases the current state, and stores the incompatible state in the current state table.

6. The apparatus of claim 1, wherein the action found by the searching is mapped by a combination that includes a maximum number of additional states stored in the current state table that match the current state.

7. A method of managing a multimedia-information-configuring graphical user interface (GUI), the method comprising:
    receiving GUI-setting data to set a configuration and an operation of a widget;
    generating a mapping-information table in which a state of the widget and an action mapped to the state are stored and a current state table in which a current state of the widget is stored by parsing the GUI-setting data;
    generating an antonym dictionary that only includes one or more states that are incompatible with the current state of the widget;
    searching the mapping information table for the action using the current state table; and
    performing the action found by the searching.

8. The method of claim 7, wherein the action is one of a transitional action in which the current state of the widget is changed and a stationary action in which the current state of the widget is not changed.

9. The method of claim 7, wherein the GUI-setting data comprises:
    data that is used to design the widget;
    content that is provided by the widget; and
    information on the state of the widget and the action mapped to the state.

10. The method of claim 7, wherein the mapping information table comprises:
    a transitional action table to store a transitional action mapped to a combination of transitional states and transitional actions related to a new state and an existing state; and a stationary action table to store a stationary action mapped to a combination of stationary states and stationary actions related to the existing state.

11. The method of claim 7, further comprising:
searching the antonym dictionary for a state that is incompatible with the current state stored in the current state table;
erasing the current state stored; and
storing the incompatible state in the current state table.

12. The method of claim 7, wherein the action found by the searching is mapped by a combination that includes a maximum number of additional states stored in the current state table that match the current state.

13. An apparatus to manage a graphical user interface (GUI), the apparatus comprising:
a storage to store received GUI-setting data that relates to a configuration and an operation of a GUI and a widget to be used in the GUI, and to store an antonym dictionary that only includes one or more states that are incompatible with a current state of the widget; and
a control unit to perform an action using a mapping information table in which a state of the widget and an action mapped to the state are stored and a current state table in which the current state of the widget is stored.

14. The apparatus of claim 13, wherein the control unit generates the mapping information table and the current state table based on the received GUI-setting data.

15. The apparatus of claim 13, wherein the action comprises one of a transitional action in which the current state of the widget is changed and a stationary action in which the current state of the widget is not changed.

16. The apparatus of claim 13, wherein the control unit searches the antonym dictionary for an incompatible state, erases the current state, and stores the incompatible state in the current state table when the state is changed to the current state.

17. A method of managing a graphical user interface (GUI), the method comprising:
storing received GUI-setting data that relates to a configuration and an operation of a GUI and a widget to be used in the GUI;
performing an action using a mapping information table in which a state of the widget and the action mapped to the state are stored and a current state table in which a current state of the widget is stored; and
generating an antonym dictionary that only includes one or more states that are incompatible with the current state of the widget.

18. The method of claim 17, further comprising:
generating the mapping information table and the current state table based on the received GUI-setting data.

19. The method of claim 17, further comprising:
searching the antonym dictionary for an incompatible state;
erasing the current state; and
storing the incompatible state in the current state table when the state is changed to the current state.

20. A method of setting up a storage to manage widgets to be used in a graphical user interface (GUI), the method comprising:
generating a mapping information table in which a state of a widget and an action mapped to the state are stored and a current state table in which a current state of the widget is stored based on received GUI-setting data related to a configuration and an operation of a GUI and the widget to be used in the GUI;
storing the generated mapping information table and the generated current state table in the storage; and
generating, from the received GUI-setting data, an antonym dictionary that only includes one or more states that are incompatible with the current state of the widget.

21. The method of claim 20, wherein the generating of the mapping information table comprises:
generating from the received GUI-setting data a transitional action table to store a transitional action mapped to a combination of transitional states and transitional actions related to a new state and an existing state of the widget; and
generating from the received GUI-setting data a stationary action table to store a stationary action mapped to a combination of stationary states and stationary actions related to the existing state of the widget.

22. An apparatus to set up a storage to manage widgets to be used in a graphical user interface (GUI), comprising:
a control unit to generate a mapping information table in which a state of a widget and an action mapped to the state are stored, a current state table in which a current state of the widget is stored based on received GUI-setting data related to a configuration and an operation of a GUI and the widget to be used in the GUI, and an antonym dictionary that only includes one or more states that are incompatible with the current state of the widget; and
a storage to store the generated mapping information table, the generated current state table, and the antonym dictionary.

23. The apparatus of claim 22, wherein the control unit generates the mapping information table from the GUI-setting data to comprise:
a transitional action table to store a transitional action mapped to a combination of transitional states and transitional actions related to a new state and an existing state of the widget; and
a stationary action table to store a stationary action mapped to a combination of stationary states and stationary actions related to the existing state of the widget.

24. A method of using widgets stored in a storage to interact with a graphical user interface (GUI), the method comprising:
performing an action on a GUI by changing a widget of the GUI from an existing state to a new state, wherein the performing includes referring to an antonym dictionary that only includes one or more states that are incompatible with the existing state of the widget; and
displaying the action, wherein the existing state and the new state of the widget are mapped to the action in a mapping information table, the new state is stored in a current state table, and the mapping information table and the current state table are set up based on received GUI-setting data related to a configuration and an operation of a GUI and the widget to be used in the GUI.

25. The method of claim 24, wherein the performing comprises:
generating the current state table when the widget is changed from the existing state to the new state.

26. The method of claim 25, wherein the performing further comprises:
determining whether the action corresponds to a transitional action; and
if so, registering the transitional action.

27. The method of claim 26, wherein the performing further comprises:
   determining whether the action corresponds to a stationary action; and
   if so, registering the stationary action.

28. The method of claim 27, further comprising performing the transitional action and the stationary action in a registered order if both the transitional action and the stationary action are registered.

29. An apparatus to use widgets stored in a storage to interact with a graphical user interface (GUI), comprising:
   a control unit to perform an action on a GUI by changing a widget of the GUI from an existing state to a new state, wherein the control unit refers to an antonym dictionary that only includes one or more states that are incompatible with the existing state of the widget; and
   a display unit to display the action, wherein the new state and the existing state of the widget are mapped to the action in a mapping information table, the new state is stored in a current state table, and the mapping information table and the current state table are set up based on received GUI-setting data related to a configuration and an operation of a GUI and the widget to be used in the GUI.

30. The apparatus of claim 29, wherein the control unit configures the current state table when the widget is changed from the existing state to the new state.

31. The apparatus of claim 30, wherein the control unit determines whether the action corresponds to a transitional action, and if so, registers the transitional action.

32. The apparatus of claim 31, wherein the control unit determines whether the action corresponds to a stationary action, and if so, registers the stationary action.

33. The apparatus of claim 32, wherein the control unit performs the transitional action and the stationary action in a registered order if both the transitional action and the stationary action are registered.

* * * * *